(No Model.)
C. A. CLAUSSEN.
FASTENING FOR BRACELETS AND OTHER ARTICLES OF JEWELRY.
No. 301,677. Patented July 8, 1884.
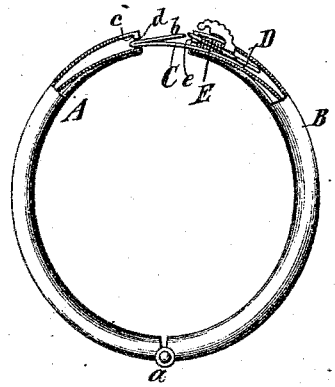
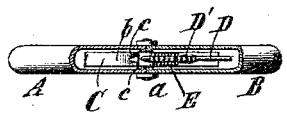
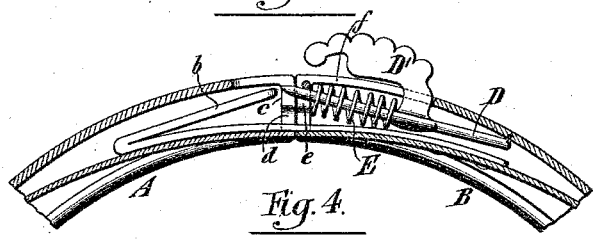
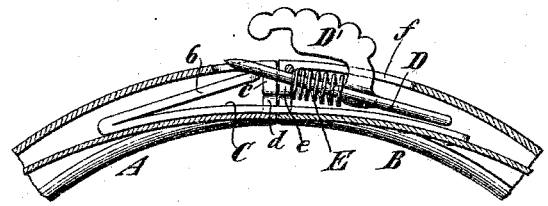
Witnesses:—
James R. Bowen
T. F. Keane
Inventor:—
Charles A. Claussen
by his attorneys
Gifford & Brown

UNITED STATES PATENT OFFICE.

CHARLES A. CLAUSSEN, OF BROOKLYN, NEW YORK.

FASTENING FOR BRACELETS AND OTHER ARTICLES OF JEWELRY.

SPECIFICATION forming part of Letters Patent No. 301,677, dated July 8, 1884.

Application filed March 10, 1884. (No model.)

*To all whom it may concern:*

Be it known that I, CHARLES A. CLAUSSEN, of Brooklyn, in the county of Kings and State of New York, have invented a certain new and useful Improvement in Fastenings for Bracelets and other Articles of Jewelry, of which the following is a specification.

The object of this improvement is to provide a more secure fastening for a bracelet and analogous articles than any of those now in common use.

In the accompanying drawings, Figure 1 is a partly sectional side view of a bracelet provided with a fastening embodying my improvement. Fig. 2 is a partly sectional view of the same, taken in a plane at right angles to Fig. 1. Fig. 3 is an enlarged sectional view of the meeting ends of the two parts of the bracelet, the parts of the fastening being shown in one position; and Fig. 4 is a similar view with parts shown in a different position.

Similar letters of reference designate corresponding parts in all the figures.

A B designate two parts, of which the bracelet is composed. They may be made of any suitable shape and material. As here shown, they are of tubular construction and semi-elliptical in shape. Opposite ends are permanently united by a hinge, a, which may be of any desirable construction. The other ends are united by a fastening, which is of such construction that they may be connected or disconnected at pleasure. This fastening comprises a catch, C, consisting of a strip of resilient metal fastened at one end in the part B, extending therefrom into the other part, A, and bent back, so as to form a barb or hook, b. The barb or hook b, when inserted in the part A, engages with a shoulder, c, located adjacent to the opening d, through which the catch enters the said part A, and thereby connects the meeting ends of the parts A B together. By pressing down the barb or hook b, it will be disengaged from the shoulder c, and then the catch may be withdrawn through the opening d, so as to disconnect the parts.

D designates a pin, which forms a push-piece arranged in the part B adjacent to the catch C. This pin is supported in the part B in such manner that it may be slid longitudinally either into a position over the barb or hook b of the catch C, as shown in Fig. 4, or into a position beyond the same, as shown in Figs. 1, 2, and 3. The latter is its normal position. The pin D, after being moved into a position adjacent to the barb or hook of the catch, may be forced inward to depress the barb or hook. A spiral spring, E, is coiled around it between a hand-piece, D', extending from the pin and shoulder e in the part B adjacent to the opening through which the pin works. This spring holds the pin D in a position beyond the barb or hook b of the catch C, except when the pin is otherwise actuated. The hand-piece D' extends through a slot, f, in the outer portion of the part B, so that it can be manipulated to move the pin D longitudinally and to press it inward. If the hand-piece D' should be pressed inward while the pin D is in its normal position, no effect will be produced upon the barb or hook b of the catch C, for the pin cannot then reach the said barb or hook. Any accidental pressure upon the hand-piece D' of the pin D will not, therefore, effect the disengagement of the catch from the part A as it would if the hand-piece were permanently affixed to the barb or hook of the catch. When it is desired to disengage the catch from the part A, the hand-piece D' of the pin D is manipulated, so as to force the pin over the barb or hook of the catch and then to press it inward. By pressing the pin inward, when it is over the barb or hook of the catch, the said barb or hook will be disengaged from the part A.

It will be seen that by my improvement I produce a fastening for a bracelet which, while simple in construction, cannot be accidentally operated by merely pressing the hand-piece inward while the hand-piece is in its normal position.

The fastening which I have described may be used for necklaces and various other articles. It is not confined to an article composed of parts connected by a hinge, but may be used in any article where the ends of two parts are to be detachably connected.

What I claim as my invention, and desire to secure by Letters Patent, is—

1. The combination, with a bracelet or other article, of a fastening for meeting ends thereof, consisting of a catch secured to one end of said article, and provided with a barb or hook for engaging with the other end of said article, and a push-piece adapted to be moved into a position over the barb or hook, and then by an inward pressure to depress the barb or hook, and adapted also to be moved into a position beyond the barb or hook, so that if then accidentally moved inward, it will not depress the barb or hook, substantially as specified.

2. The combination, with a bracelet or other article, of a fastening for meeting ends thereof, consisting of a catch secured to one end of said article, and provided with a barb or hook for engaging with the other end of said article, a push-piece for operating upon the said barb or hook, and capable of being moved independently of the said barb or hook, and a spring for keeping the said device normally out of reach of the said barb or hook, substantially as specified.

3. The combination, with a bracelet or other article, of the catch C, provided with a barb or hook, $b$, the pin D, a hand-piece therefor, and the spring E, substantially as specified.

CHARLES A. CLAUSSEN.

Witnesses:
T. J. KEANE,
E. S. ROCHE.